(12) United States Patent
Xin et al.

(10) Patent No.: US 12,081,378 B2
(45) Date of Patent: Sep. 3, 2024

(54) SYSTEMS AND METHODS FOR CONJUGATE DATA MODULATION

(71) Applicant: ZTE CORPORATION, Guangdong (CN)

(72) Inventors: Yu Xin, Shenzhen (CN); Jian Hua, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 449 days.

(21) Appl. No.: 17/473,922

(22) Filed: Sep. 13, 2021

(65) Prior Publication Data

US 2021/0409185 A1 Dec. 30, 2021

Related U.S. Application Data

(63) Continuation of application No. PCT/CN2019/078490, filed on Mar. 18, 2019.

(51) Int. Cl.
*H04L 27/26* (2006.01)
*H04L 5/00* (2006.01)
*H04L 5/02* (2006.01)

(52) U.S. Cl.
CPC ........ *H04L 27/2602* (2013.01); *H04L 5/0048* (2013.01); *H04L 5/023* (2013.01); *H04L 27/26025* (2021.01); *H04L 27/261* (2013.01)

(58) Field of Classification Search
CPC ............... H04L 27/2602; H04L 5/0048; H04L 5/023; H04L 27/26025; H04L 27/261; H04L 27/2657

See application file for complete search history.

(56) References Cited

U.S. PATENT DOCUMENTS

| 2003/0152022 A1* | 8/2003 | Hosur | H04L 27/2602 |
| | | | 370/208 |
| 2008/0192844 A1* | 8/2008 | Yamagata | H04L 27/2647 |
| | | | 348/E5.113 |
| 2008/0212555 A1* | 9/2008 | Kim | H04J 13/0062 |
| | | | 370/344 |

(Continued)

FOREIGN PATENT DOCUMENTS

| CN | 102271116 A | 12/2011 |
| CN | 102684819 A | 9/2012 |

(Continued)

OTHER PUBLICATIONS

Extended European Search Report for EP Appl. No. 19920495.9, dated Mar. 29, 2023 (5 pages).

(Continued)

*Primary Examiner* — Christopher M Brandt
(74) *Attorney, Agent, or Firm* — Foley & Lardner LLP

(57) ABSTRACT

This disclosure relates generally to wireless communications and, more particularly, to systems and methods for modulating user data with conjugate data for time domain communications. In one embodiment, a method performed by a device includes: modulating user data into modulated user data elements; determining conjugate data elements, wherein each conjugate data element is a conjugate or opposite conjugate of different modulated user data elements; and transmitting, over a time domain, a user data sequence comprising the modulated user data elements interleaved with the conjugate data elements.

17 Claims, 4 Drawing Sheets

(56) References Cited

U.S. PATENT DOCUMENTS

| | | | |
|---|---|---|---|
| 2009/0219801 A1* | 9/2009 | Jeong | H04L 5/0048 370/210 |
| 2014/0029952 A1 | 1/2014 | Liu et al. | |
| 2014/0269843 A1 | 9/2014 | Schaffner | |
| 2018/0123856 A1 | 5/2018 | Qu et al. | |
| 2019/0058622 A1 | 2/2019 | Bouttier et al. | |

FOREIGN PATENT DOCUMENTS

| | | |
|---|---|---|
| CN | 103916357 A | 7/2014 |
| CN | 103973619 A | 8/2014 |
| CN | 105991257 A | 10/2016 |
| CN | 108234082 A | 6/2018 |
| EP | 2 612 478 A4 | 7/2013 |
| KR | 20130073528 A | 7/2013 |
| KR | 20180065402 A | 6/2018 |
| WO | WO-2006/039185 A1 | 4/2006 |

OTHER PUBLICATIONS

International Search Report and Written Opinion for PCT Appl. No. PCT/CN2019/078490, mailed Dec. 24, 2019 (7 pages).
Second Office Action on CA Appln No. 3133715, dated Sep. 29, 2023 (4 pages).
Extended European Search Report for EP Appl. No. 19920495.9, dated Feb. 22, 2022 (7 pages).
First Office Action for CN Appl. No. 201980094266.8, dated Jun. 28, 2024 (with English translation, 13 pages).
Mitsubishi Electric, "Analysis of UQ-DFT-s-OFDM", 3GPP TSG RAN WG1 Meeting #88bis, R1-1705820, Apr. 7, 2017, Spokane, USA (7 pages).
Nokia et al., "Way forward waveform for carrier frequencies beyond 40 GHz", 3GPP TSG-RAN WG1#86bis, R1-1609599, Oct. 15, 2016, Lisbon, Portugal (8 pages).
Office Action for CA Appl. No. 3,133,715 dated Jun. 7, 2024 (4 pages).

* cited by examiner

SYSTEMS AND METHODS FOR CONJUGATE DATA MODULATION

CROSS-REFERENCE TO RELATED APPLICATION

This application claims the benefit of priority under 35 U.S.C. § 120 as a continuation of PCT Patent Application No. PCT/CN2019/078490, filed on Mar. 18, 2019, the disclosure of which is incorporated herein by reference in its entirety.

TECHNICAL FIELD

This disclosure relates generally to wireless communications and, more particularly, to systems and methods for modulating user data with conjugate data for time domain communications.

BACKGROUND

As the number of applications and services for digital data continues to explode, the demands and challenges placed on network resources and operators will continue to increase. Being able to deliver a wide variety of network performance characteristics that future services will demand is one of the primary technical challenges faced by service providers today.

Radio frequency (RF) circuits in wireless communications may generate phase noise (PN) due to factors such as jitter and instability of a crystal oscillator circuit. Phase noise may be especially acute (e.g., relatively larger) with a higher frequency carrier frequency. Phase noise can be deleterious for communications as, for example, phase noise may interfere with symbol modulation and degrade demodulation performance at a receiver. Current techniques of phase noise compensation (e.g., reduction) may require a significant amount of communication resources and processing power but still fail to produce satisfactory results. Therefore, current techniques for phase noise compensation may not be entirely satisfactory.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a device includes: modulating user data into modulated user data elements; determining conjugate data elements, wherein each conjugate data element is a conjugate or opposite conjugate of different modulated user data elements; and transmitting, over a time domain, a user data sequence comprising the modulated user data elements interleaved with the conjugate data elements.

In a further embodiment, a method performed by a device includes: receiving a user data sequence, wherein the user data sequence comprises modulated user data elements interleaved with conjugate data elements, wherein the conjugate data elements are each a conjugate or negative conjugate of different modulated user data elements; and demodulating the user data sequence to produce user data.

In a further embodiment, a device includes: a processor configured to: modulate user data into modulated user data elements, determine conjugate data elements, wherein each conjugate data element is a conjugate or opposite conjugate of different modulated user data elements; and a transmitter configured to: transmit, over a time domain, a user data sequence comprising the modulated user data elements interleaved with the conjugate data elements.

In a further embodiment, a device includes: a receiver configured to: receive a user data sequence, wherein the user data sequence comprises modulated user data elements interleaved with conjugate data elements, wherein the conjugate data elements are each a conjugate or opposite conjugate of different modulated user data elements; and a processor configured to: demodulate the user data sequence to produce user data.

BRIEF DESCRIPTION OF THE DRAWINGS

Various example embodiments of the invention are described in detail below with reference to the following Figures. The drawings are provided for purposes of illustration only and merely depict example embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION

Various example embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

The discussion below may refer to functional entities or processes which are similar to those mentioned above with respect to conventional communication systems. As would be understood by persons of ordinary skill in the art, however, such conventional functional entities or processes do not perform the functions described below, and therefore, would need to be modified or specifically configured to perform one or more of the operations described below. Additionally, persons of skill in the art would be enabled to configure functional entities to perform the operations described herein after reading the present disclosure.

Figure 1:
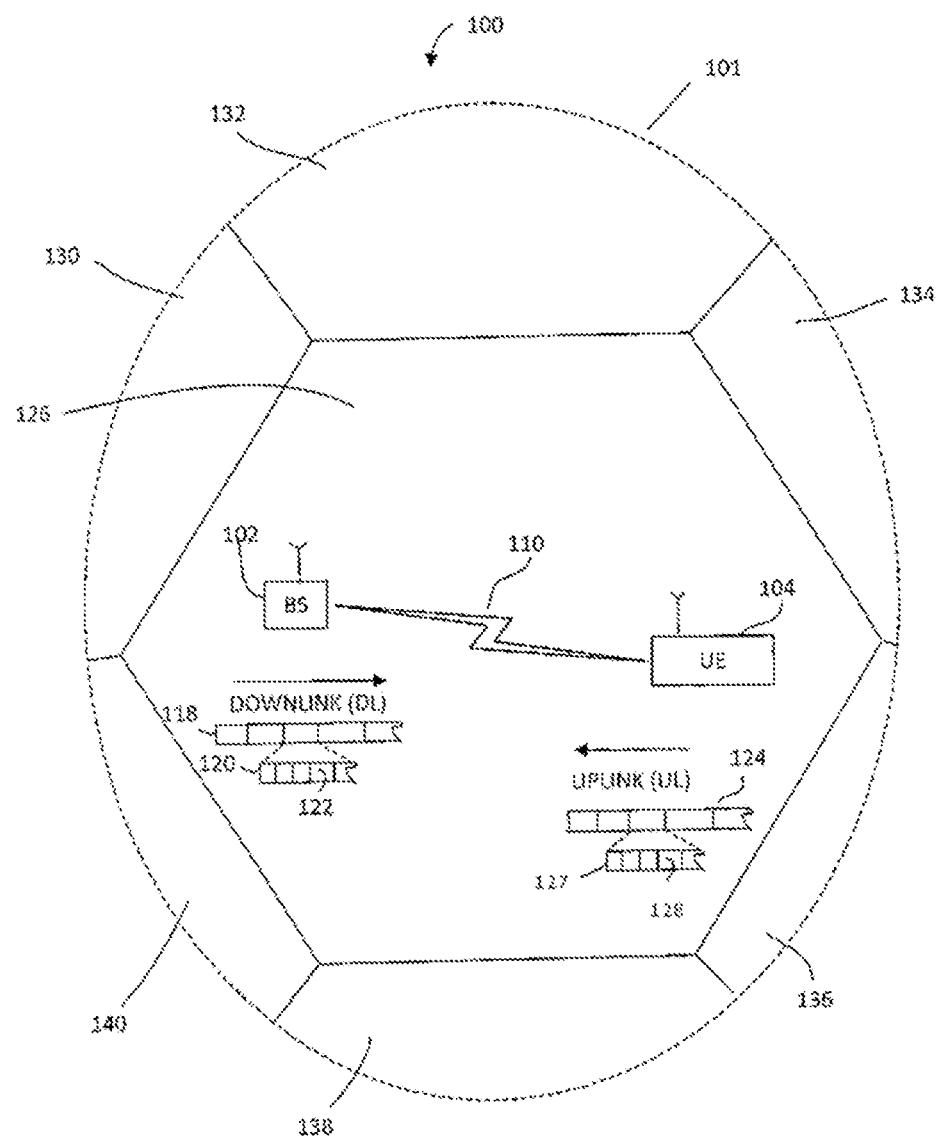
FIG. 1 illustrates an example wireless communication network in which techniques disclosed herein may be implemented, in accordance with some embodiments.

FIG. 1 illustrates an example wireless communication network 100 in which techniques disclosed herein may be implemented, in accordance with an embodiment of the present disclosure. Such an example network 100 includes a base station 102 (hereinafter "BS 102") and multiple user equipment devices 104 (hereinafter "UEs 104") that can communicate with each other via respective communication links 110 (e.g., a wireless communication channel), and a cluster of notional cells 126, 130, 132, 134, 136, 138 and 140 overlaying a geographical area with a network 101. Each UE 104 may undergo a random access procedure to join the network 101. In FIG. 1, the BS 102 and each UE 104 are contained within a respective geographic boundary of cell 126. Each of the other cells 130, 132, 134, 136, 138 and 140 may include at least one BS operating at its allocated bandwidth to provide adequate radio coverage to its intended users. Accordingly, reference to a cell may be a short hand reference to a BS with an associated coverage region or area (e.g., cell). In certain embodiments, a cell may be interchangeably referred to as a BS or a node.

For example, the BS 102 may operate at an allocated channel transmission bandwidth (e.g., spectrum) to provide adequate coverage to each UE 104. The spectrum may be regulated to define a licensed range and/or an unlicensed range. The BS 102 and each UE 104 may communicate via a downlink radio frame 118, and an uplink radio frame 124 respectively. The radio frames may also be referred to more simply as a frame. Each frame 118/124 may be further divided into sub-frames 120/127 which may include data symbols 122/128. In the present disclosure, the BS 102 and each UE 104 are described herein as non-limiting examples of devices, generally, which can practice the methods disclosed herein. Such devices may be capable of wireless and/or wired communications, in accordance with various embodiments of the invention. In certain embodiments, a communication device may refer more specifically to a UE in relationship to a BS and a communication node may refer more specifically to a BS in relation to the UE.

Figure 2:
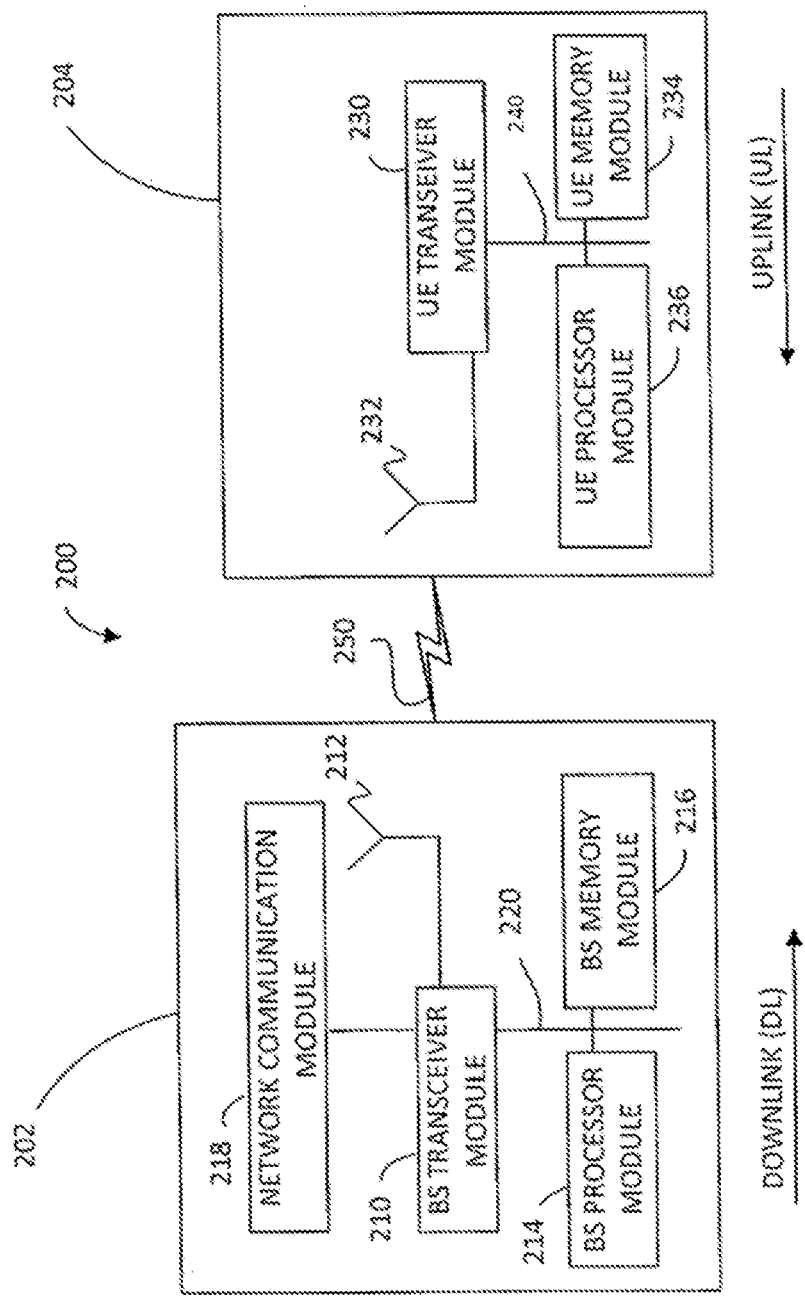
FIG. 2 illustrates a block diagram of an example wireless communication system for transmitting and receiving wireless communication signals in accordance with some embodiments.

FIG. 2 illustrates a block diagram of an example wireless communication system 200 for transmitting and receiving wireless communication signals (e.g., modulated signals such as orthogonal frequency-division multiplexing (OFDM)/orthogonal frequency-division multiple access (OFDMA) signals) in accordance with some embodiments of the invention. The system 200 may include components and elements configured to support known or conventional operating features that need not be described in detail herein. In one example embodiment, system 200 can be used to transmit and receive data symbols in a wireless communication environment such as the wireless communication environment or network 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver module 230 may be referred to herein as an "uplink" transceiver module 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver module 210 may be referred to herein as a "downlink" transceiver module 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceiver modules 210 and 230 are coordinated in time such that the uplink receiver is coupled to the uplink antenna 232 for reception of transmissions over the wireless transmission link 250 at the same time that the downlink transmitter is coupled to the downlink antenna 212.

The UE transceiver module 230 and the BS transceiver module 210 are configured to communicate via the wireless data communication link 250, and cooperate with a suitably configured RF antenna arrangement 212/232 that can support a particular wireless communication protocol and modulation scheme. In some example embodiments, the UE transceiver module 210 and the BS transceiver module 210 are configured to support industry standards such as the Long Term Evolution (LTE) and emerging 5G standards, and the like. It is understood, however, that the invention is not necessarily limited in application to a particular standard and associated protocols. Rather, the UE transceiver module 230 and the BS transceiver module 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage and/or computer-readable medium known in the art. In this regard, memory modules 216 and 234 may be coupled to the transceiver modules 210 and 230, respectively, such that the transceiver modules 210 and 230 can read information from, and write information to, memory modules 216 and 234, respectively. The memory modules 216 and 234 may also be integrated into their respective transceiver modules 210 and 230. In some embodiments, the memory modules 216 and 234 may each include a cache memory for storing temporary variables or other intermediate information during execution of instructions to be executed by transceiver modules 210 and 230, respectively. Memory modules 216 and 234 may also each include non-volatile memory for storing instructions to be executed by the transceiver modules 210 and 230, respectively.

The network communication module 218 generally represents the hardware, software, firmware, processing logic, and/or other components of the base station 202 that enable bi-directional communication between the BS transceiver module 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that the BS transceiver module 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically or virtually constructed, programmed, formatted and/or arranged to perform the specified operation or function.

A single carrier system (e.g., discrete fourier Transform OFDM (DFT-S-OFDM) and single carrier quadrature amplitude modulation (SC QAM)) may provide a relatively better candidate waveform for high frequency communications (e.g., communications at a higher frequency carrier frequency) than multi-carrier systems. For example, a single carrier system may have a lower peak-to-average ratio than a multi-carrier system.

As noted above, phase noise for higher frequency communications may be relatively larger than for lower frequency communications. A common phase error (CPE) compensation technique may be utilized to reduce phase noise. CPE compensation techniques generally include finding a mean value of a phase rotation in each OFDM symbol according to a continuous pilot signal or a scattered pilot signal. This mean value may be utilized to compensate for phase nose. CPE compensation techniques may also include monitoring for repeated data characteristics of a cyclic prefix (CP) to determine a phase deviation of data to compensate for phase noise. CPE compensation techniques may be utilized at lower frequency communications where phase noise is relatively low. However, CPE compensation techniques may not be as useful to reduce phase noise for high frequency communications as it is for lower frequency communications.

Accordingly, when the carrier frequency is high and the phase noise is large, it may be desirable to consider compensating for phase noise in each data block or in each OFDM symbol. However, the compensation of phase noise in each data block or OFDM symbol may lead to additional communication overhead due to the addition of pilot signals in each data block or OFDM symbol. This issue may be more acute in single-carrier data modulation schemes for wireless communication which may utilize a higher frequency but be susceptible to channel fading and a low signal to noise ratio (SNR).

Accordingly, systems and methods in accordance with various embodiments are directed to conjugate data modulation that modulates user data for communications in a manner that reduces phase error. Conjugate data modulation may include modulating (e.g., phase shift key (PSK) modulating) user data into modulated user data elements, which are interleaved with conjugate data elements (discussed further below). For ease of discussion, these modulated user data elements may be referred to as first data. These user data elements (e.g., first data) may be interleaved with conjugate data elements. For ease of discussion, these conjugate data elements may also be referred to as second data. These conjugate data elements may each be a conjugate or opposite conjugate of different modulated user data elements. Furthermore, the combination of the modulated user data elements (e.g., first data) interleaved with conjugate data elements (e.g., second data) may be referred to as a user data sequence. For ease of discussion this user data sequence may be referred to as a third data sequence. This user data sequence (e.g., third data sequence) may then be transmitted to a receiver. In certain embodiments, to create a fourth data sequence, this user data sequence may be concatenated with a first pilot sequence at a front (e.g., an earliest transmitted data element of the user data sequence) and a second pilot sequence at a rear (e.g., a last transmitted data element of the user data sequence). The first pilot sequence and the second pilot sequence may be a predetermined set or collection of data elements known to the receiver prior to demodulating the first pilot sequence and/or second pilot sequence. For ease of discussion, the first pilot sequence may be referred to as a first sequence or S1. Also, for ease of explanation, the second pilot sequence may be referred to as a second sequence or S2.

Accordingly, in certain embodiments, conjugate data elements (e.g., second data) may be inserted between individual data elements of user data elements (e.g., first data) to obtain a user data sequence (e.g., third data sequence). In the user data sequence (e.g., third data sequence), each data element of the second data is conjugated or oppositely conjugated with an adjacent one of the user data elements (e.g., first data). Furthermore, a first pilot sequence (e.g., S1) and a second pilot sequence (e.g., S2) may be inserted in front of and behind the user data sequence (e.g., third data sequence), respectively, to obtain a fourth data sequence that may be transmitted to a receiver. The first pilot sequence (e.g., S1) and second pilot sequence (e.g., S2) may be reference sequences, that is sequences known to the receiving end (e.g., receiver).

In certain embodiments, the user data sequence (e.g., third data sequence) comprises an equal number of modulated user data elements and conjugate data elements (e.g., second data). Stated another way, the user data sequence (e.g., first data) is equal in length to the conjugate data elements (e.g., second data) such that each user data element (e.g., first data) is adjacent to a corresponding conjugate data element (e.g., second data).

In certain embodiments, the user data sequence (e.g., third data sequence) comprises the modulated user data elements (e.g., first data) interleaved with the conjugate data elements (e.g., second data) in consistent intervals. Stated another way, the conjugate data elements (e.g., second data) may be uniformly inserted among the modulated user data elements (e.g., first data). That is, in the user data sequence (e.g., third data sequence), adjacent data intervals of the conjugate data elements (e.g., second data) are the same.

In certain embodiments, the user data sequence (e.g., third data sequence) comprises the modulated user data elements (e.g., first data) interleaved with the conjugate data elements (e.g., second data) at predetermined time domain locations. For example, every modulated user data element (e.g., first data) may be followed by a corresponding one of the conjugate data elements (e.g., second data), every conjugate data element (e.g., second data) may be followed by a corresponding one of the user data elements (e.g., first data), every second modulated user data element (e.g., first data) may be followed by a corresponding one of the conjugate data elements (e.g., second data), every conjugate data element (e.g., second data) may be followed by a corresponding one of every second modulated user data elements (e.g., first data), every third modulated user data element (e.g., first data) may be followed by a corresponding one of the conjugate data elements (e.g., second data), every conjugate data element (e.g., second data) may be followed by a corresponding one of every third modulated user data elements (e.g., first data), every fourth modulated user data element (e.g., first data) may be followed by a corresponding one of the conjugate data elements (e.g., second data), every conjugate data element (e.g., second data) may be followed by a corresponding one of every fourth modulated user data element (e.g., first data), and so on. Stated another way, the conjugate data elements (e.g., second data) are inserted among the modulated user data elements (e.g., first data) at predefined time domain locations. For example, the predefined position may be: inserted at a position of 2n, 3n or 4n in the time domain, where n is a positive integer. When the predefined position is 2n, one conjugate data element (e.g., second data) is inserted every other modulated user data element (e.g., first data); when the predefined position is 3n, one conjugate data element (e.g., second data) is inserted every two modulated user data element (e.g., first data); when the predefined position is 4n, one conjugate data element (e.g., second data) is inserted every three modulated user data element (e.g., first data). Although certain embodiments describe how conjugate data elements (e.g., second data) may immediately follow (e.g., be later in the time domain) and be adjacent to a corresponding modulated user data element (e.g., first data) of a conjugate pair, any ordering of conjugate pairs may be utilized as desired for different applications in various embodiments. For example, other embodiments may have a modulated user data element (e.g., first data) immediately follow (e.g., be later in the time domain) and be adjacent to a corresponding conjugate data element (e.g., second data) of a conjugate pair.

In certain embodiments, a combination of the front pilot sequence (e.g., S1), the user data sequence (e.g., third data sequence), and the rear pilot sequence (e.g., S2) is a predetermined number of data elements. Stated another way, the fourth data sequence has a constant length. For example, a combination of the front pilot sequence (e.g., S1), the user data sequence (e.g., third data sequence), and the rear pilot sequence (e.g., S2) may occupy a single Fourier window (e.g., a window length of subsequent FFT processing).

In certain embodiments, the front pilot sequence begins at a beginning of the single Fourier window and the rear pilot sequence ends at an end of the single Fourier window. Stated another way, the starting and ending position of the fourth data sequence may be at a starting and ending position of subsequent FFT processing. Also, the start and stop positions of subsequent FFT processing may be at the beginning of the front pilot sequence (e.g., S1) and the end of the rear pilot sequence (e.g., S2), respectively.

In certain embodiments, when the length of the front pilot sequence (e.g., S1) or rear pilot sequence (e.g., S2) is changed, the length of the conjugate data elements (e.g., second data) may also change while the length of the modulated user data element (e.g., first data) may be kept constant. Alternatively, when the length of the length of the modulated user data element (e.g., first data) or conjugate data elements (e.g., second data) is changed, the length of the front pilot sequence (e.g., S1) or rear pilot sequence (e.g., S2) may be changed as well.

In certain embodiments, the user data sequence is transmitted after filtering and conversion from a digital signal to an analog signal. For example, transmitting the fourth data sequence (e.g., a combination of the front pilot sequence (e.g., S1), the user data sequence (e.g., third data sequence), and the rear pilot sequence (e.g., S2)) further includes performing FFT processing on the fourth data sequence, and then performing subcarrier mapping, and then performing inverse fast Fourier transform (IFFT) processing. This may result in a fifth data sequence that is transmitted via the IFFT. In various embodiments, FFT processing may broadly refer to discrete Fourier transform (DFT) processing, and IFFT processing includes the concept of inverse discrete Fourier transform (IDFT) processing. In particular embodiments, transmitting the fourth data sequence may include filtering and digital-to-analog converting the fourth data sequence, and then transmitting the digital-to-analog converted signal (e.g., without FFT and IFFT processing).

In certain embodiments, control information may be transmitted. This control information may include time domain locations associated with the conjugate data elements (e.g., second data) to a recipient of the user data sequence (e.g., third data sequence). This control information may be in a control information format where the control information may be used to indicate a location of the conjugate data elements (e.g., second data) predefined in the time domain. In various embodiments, the control information format may be a control information format transmitted by a downlink or uplink control channel. In further embodiments, the control information may be transmitted as part of a control channel or radio resource control (RRC) signaling (e.g., in a control information format for downlink or uplink RRC signaling transmissions).

As noted above, reference to conjugation of the conjugate data elements (e.g., second data) with the modulated user data (e.g., first data) may refer to conjugation or negative conjugation. Accordingly, in the user data sequence (e.g., third data sequence), each data element of the conjugate data elements (e.g., second data) is conjugated or oppositely conjugated with an adjacent one of the modulated user data (e.g., first data), which has the advantage of reducing phase noise in the processing at a receiver. For example, the phase noise of adjacent data elements in the time domain may be approximately equal, thus phase noise can be estimated based on joint processing of adjacent data elements that form conjugate pairs that are conjugated or opposite conjugated. Moreover, since the data elements are conjugated or oppositely conjugated to each other, joint demodulation can be performed to improve the received signal to noise ratio.

In certain embodiments, the conjugate data elements (e.g., second data) may be equal in quantity to the modulated user data (e.g., first data). This may improve the density of phase noise estimation in the time domain (e.g., due to introducing conjugate pairs for each modulated user data (e.g., first data)). Also, the user data sequence (e.g., third data sequence) can then be directly demodulated by joint processing without first estimating the phase noise of each data element insertion position. This may be because the locations of modulated user data elements and conjugate data elements are predetermined or known to the transmitter and receiver.

In particular embodiments, it may be advantageous to concatenate the user data sequence (e.g., third data sequence) with the front pilot sequence (e.g., S1) at one end (e.g., a front end) and the rear pilot sequence (e.g., S2) at the other end (e.g., a back end). For example, this would allow for CPE compensation in an entire symbol to be estimated based on pilot signals including the front pilot sequence (e.g., S1) and the rear pilot sequence (e.g., S2). More specifically, once the CPE is estimated, the CPE can be compensated (e.g., removed) from the fourth data sequence during demodulation.

In further embodiments, it may be advantageous to insert the conjugate data elements (e.g., second data) among the modulated user data elements (e.g., first data) at predefined time domain positions. For example, these time domain positions may represent an embodiment where not every modulated user data element (e.g., first data) is adjacent to a corresponding conjugate data element (e.g., second data). This arrangement enables the increase of user data throughput for a same amount of overall time domain resource as fewer time domain resources need to be utilized for the conjugate data elements (e.g., second data). Additionally, insertion of conjugate data element (e.g., second data) at predefined time domain positions may be performed when the phase noise within a data block or within an OFDM symbol does not change much. Thus, the insertion of conjugate data element (e.g., second data) at predefined time domain positions may be used selectively in situations where the phase noise is known to be relatively smaller (e.g., as based on an actual phase noise variation degree, and the position density of the estimated phase noise is appropriately reduced, thereby improving the spectral efficiency) and/or where greater user data throughput is desired.

As noted above, in certain embodiments the length of the fourth data sequence may be a length of a Fourier transform window of subsequent FFT processing. This may simplify demodulation as the subcarrier spacing in the frequency domain can be kept unchanged, and orthogonality can be more easily achieved for frequency division multiplexing.

In particular embodiments, control information may be transmitted to a receiver in a control information format, where the indication information may be used to indicate a predetermined location of the conjugate data elements (e.g., second data) in the time domain. Accordingly, the time domain locations of the conjugate data elements (e.g., second data) and the lengths of the front pilot sequence (e.g., S1) and the rear pilot sequence (e.g., S2) can be adjusted in real time according to the magnitude of the delay and phase noise, thereby improving the system's ability to resist phase noise and multipath delay. This may also improve spectrum utilization as a receiver of the fourth data sequence may more easily demodulate the fourth data sequence using the control information.

Figure 3:
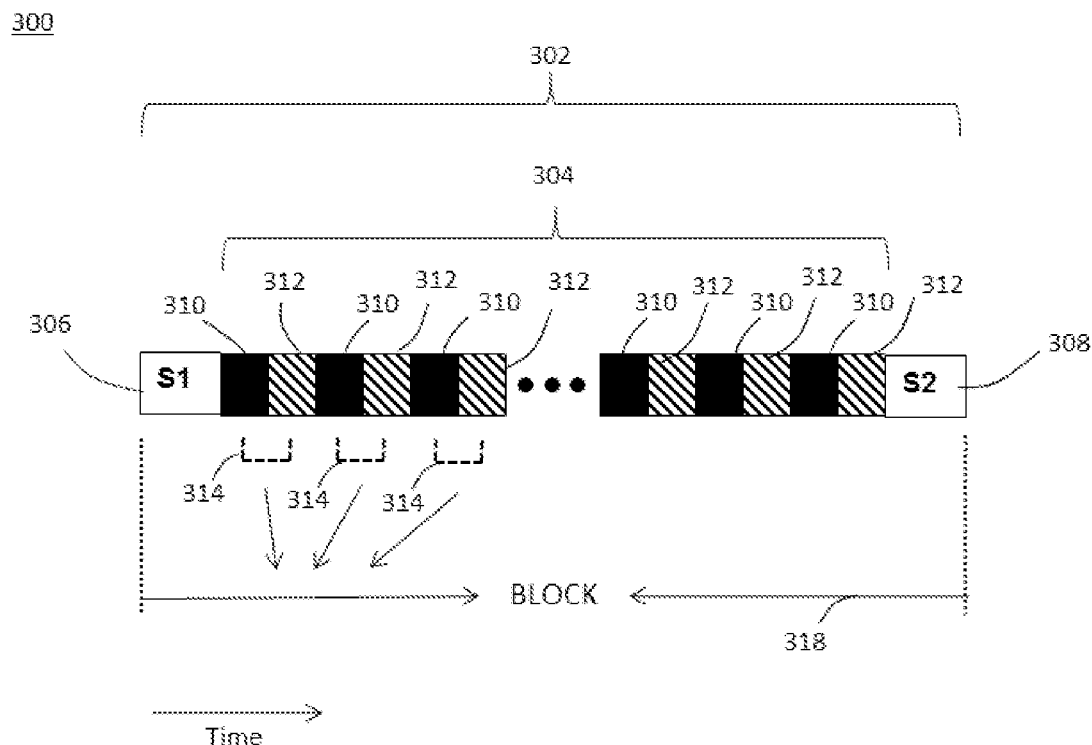
FIG. 3 is a conceptual block diagram of a fourth data sequence in the time domain, in accordance with some embodiments.

FIG. 3 is a conceptual block diagram 300 of a fourth data sequence 302 in the time domain, in accordance with some embodiments. This fourth data sequence 302 may include a user data sequence 304 (e.g., third data sequence) concatenated with the front pilot sequence 306 (e.g., S1) at one end (e.g., a front end with an earlier time domain location) and the rear pilot sequence 308 (e.g., S2) at the other end (e.g., a back end with a later time domain location). Furthermore, the user data sequence 304 (e.g., third data sequence) may include modulated user data elements 310 (e.g., first data) interleaved with conjugate data elements 312 (e.g., second data). Additionally, the size of the fourth data sequence 302 may be equivalent to a single data block 318.

More specifically, the interleaving may result in having each modulated user data element 310 (e.g., first data) be adjacent with a respective conjugate data element 312 (e.g., second data) so that conjugate pairs 314 are formed between the adjacent modulated user data elements 310 (e.g., first data) and respective conjugate data element 312 (e.g., second data). As noted above, a conjugate data element 312 (e.g., second data) may be a conjugate or a negative conjugate of a respective modulated user data element 310 (e.g., first data). For example, suppose the modulated user data elements 310 (e.g., first data) are: [1+i, 1−i, −1+i, −1−i, . . . , −1+i, 1+i]. Assuming that the conjugate data elements 312 (e.g., second data) are evenly inserted among the modulated user data elements 310 (e.g., first data), the second data sequence, as a conjugate of respective modulated user data elements 310 (e.g., first data) is: [1−i, 1+i, −1−i, −1+i, . . . , −1−i, 1−i]. Then, after interleaving, the obtained user data sequence 304 (e.g., third data sequence) may be: [1+i, 1−i, 1−i, 1+i, −1+i, −1−i, −1−i, −1+i . . . , −1+i, −1−i, 1+i, 1−i]. Also, assuming that the conjugate data elements 312 (e.g., second data) are oddly inserted among the modulated user data elements 310 (e.g., first data), then, after interleaving, the obtained user data sequence 304 (e.g., third data sequence) may be: [1−i, 1+i, 1+i, 1−i, −1−i, −1+i, −1+i, −1−i . . . , −1−i, −1+i, 1−i, 1+i].

In certain embodiments, the number of modulated user data elements 310 (e.g., first data) and conjugate data elements 312 (e.g., second data) may be the same (e.g., they may have the same length). Stated another way, the conjugate data elements 312 (e.g., second data) may be evenly or oddly inserted among the modulated user data elements 310 (e.g., first data). That is, in the user data sequence 304 (e.g., third data sequence) obtained after the insertion, the adjacent data intervals of the conjugate data elements 312 (e.g., second data) are the same. Inserting front pilot sequence 306 (e.g., S1) at one end (e.g., a front end with an earlier time domain location) and the rear pilot sequence 308 (e.g., S2) at the other end (e.g., a back end with a later time domain location) may result in the fourth data sequence 302. In certain embodiments, the lengths of the front pilot sequence 306 (e.g., S1) and the rear pilot sequence 308 (e.g., S2) may be the same or different, depending on the multipath nature of the wireless channel. In further embodiments, a length adjustment may be such that the front pilot sequence 306 (e.g., S1) and the rear pilot sequence 308 (e.g., S2) are the same length. In various embodiments, the size of the fourth data sequence 302 may be equivalent to a single data block 318.

In particular embodiments, the conjugate data elements 312 (e.g., second data) may have a predefined position in the time domain of 2n, where n is a positive integer. Stated another way, the conjugate data elements 312 (e.g., second data) may be at an even position of the user data sequence 304 (e.g., third data sequence). The control information may be indicated from the transmitter of the fourth data sequence to a receiver of the fourth data sequence via a control information format (e.g., Info-1).

Figure 4:
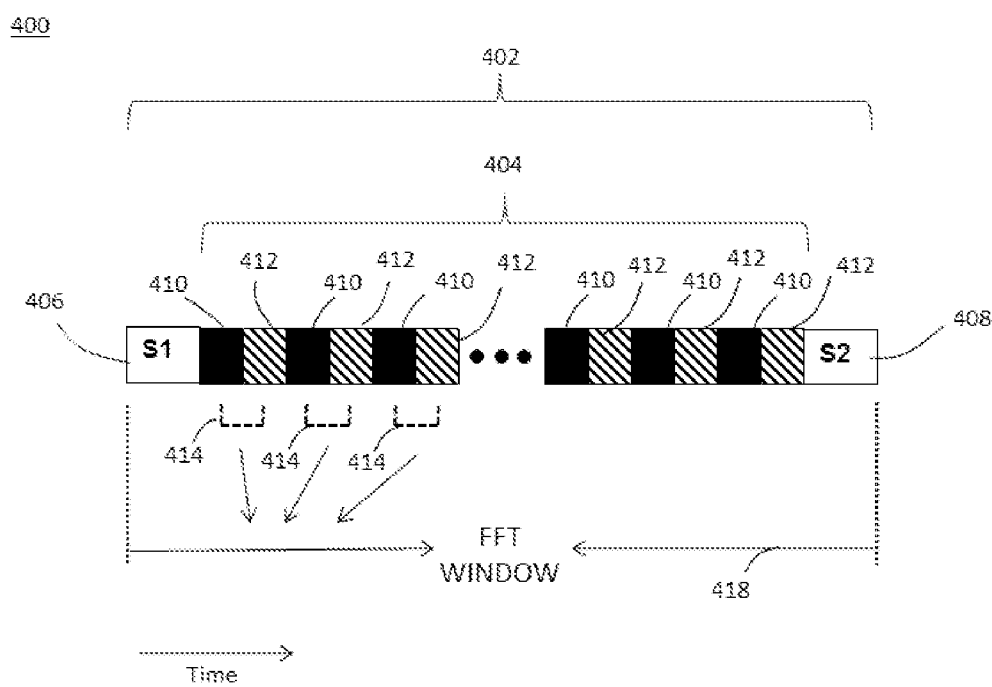
FIG. 4 is a conceptual block diagram of a fourth data sequence in the time domain, in accordance with some embodiments.

FIG. 4 is a conceptual block diagram 400 of a fourth data sequence 402 in the time domain, in accordance with some embodiments. The embodiments of FIG. 4 may differ from that of FIG. 3 in that FIG. 4 illustrates the fourth data sequence to be equivalent to a single Fourier window (e.g., a window length for FFT processing).

This fourth data sequence 402 may include a user data sequence 404 (e.g., third data sequence) concatenated with the front pilot sequence 406 (e.g., S1) at one end (e.g., a front end with an earlier time domain location) and the rear pilot sequence 408 (e.g., S2) at the other end (e.g., a back end with a later time domain location). Furthermore, the user data sequence 404 (e.g., third data sequence) may include modulated user data elements 410 (e.g., first data) interleaved with conjugate data elements 412 (e.g., second data). Additionally, the size of the fourth data sequence 402 may be equivalent to a single Fourier window 418 (e.g., a window length for FFT processing).

More specifically, the interleaving may result in having each modulated user data element 410 (e.g., first data) be adjacent with a respective conjugate data element 412 (e.g., second data) so that conjugate pairs 414 are formed between the adjacent modulated user data elements 410 (e.g., first data) and respective conjugate data element 412 (e.g., second data). As noted above, a conjugate data element 412 (e.g., second data) may be a conjugate or a negative conjugate of a respective modulated user data element 410 (e.g., first data). For example, suppose the modulated user data elements 410 (e.g., first data) are: [1+i, 1−i, −1+i, −1−i, . . . , −1+i, 1+i]. Assuming that the conjugate data elements 412 (e.g., second data) are evenly inserted among the modulated user data elements 410 (e.g., first data), the second data sequence, as a conjugate of respective modulated user data elements 410 (e.g., first data) is: [1−i, 1+i, −1−i, −1+i, . . . , −1−i, 1−i]. Then, after interleaving, the obtained user data sequence 404 (e.g., third data sequence) may be: [1+i, 1−i, 1−i, 1+i, −1+i, −1−i, −1−i, −1+i . . . , −1+i, −1−i, 1+i, 1−i]. Also, assuming that the conjugate data elements 412 (e.g., second data) are oddly inserted among the modulated user data elements 410 (e.g., first data), then, after interleaving, the obtained user data sequence 404 (e.g., third data sequence) may be: [1−i, 1+i, 1+i, 1−i, −1−i, −1+i, −1+i, −1−i . . . , −1−i, −1+i, 1−i, 1+i].

In certain embodiments, the number of modulated user data elements 410 (e.g., first data) and conjugate data elements 412 (e.g., second data) may be the same (e.g., they may have the same length). Stated another way, the conjugate data elements 412 (e.g., second data) may be evenly or oddly inserted among the modulated user data elements 410 (e.g., first data). That is, in the user data sequence 404 (e.g., third data sequence) obtained after the insertion, the adjacent data intervals of the conjugate data elements 412 (e.g., second data) are the same. Inserting front pilot sequence 406 (e.g., S1) at one end (e.g., a front end with an earlier time domain location) and the rear pilot sequence 408 (e.g., S2) at the other end (e.g., a back end with a later time domain location) may result in the fourth data sequence. In certain embodiments, the lengths of the front pilot sequence 406 (e.g., S1) and the rear pilot sequence 408 (e.g., S2) may be the same or different, depending on the multipath nature of the wireless channel. In further embodiments, a length adjustment may be such that the front pilot sequence 406 (e.g., S1) and the rear pilot sequence 408 (e.g., S2) are the same length. In various embodiments, the size of the fourth data sequence 402 may be equivalent to a single Fourier window 418 (e.g., a window length for FFT processing).

In particular embodiments, the conjugate data elements 412 (e.g., second data) may have a predefined position in the time domain of 2n, where n is a positive integer. Stated another way, the conjugate data elements 412 (e.g., second data) may be at an even position of the user data sequence 404 (e.g., third data sequence). The control information may be indicated from the transmitter of the fourth data sequence to a receiver of the fourth data sequence via a control information format (e.g., Info-1).

Figure 5:
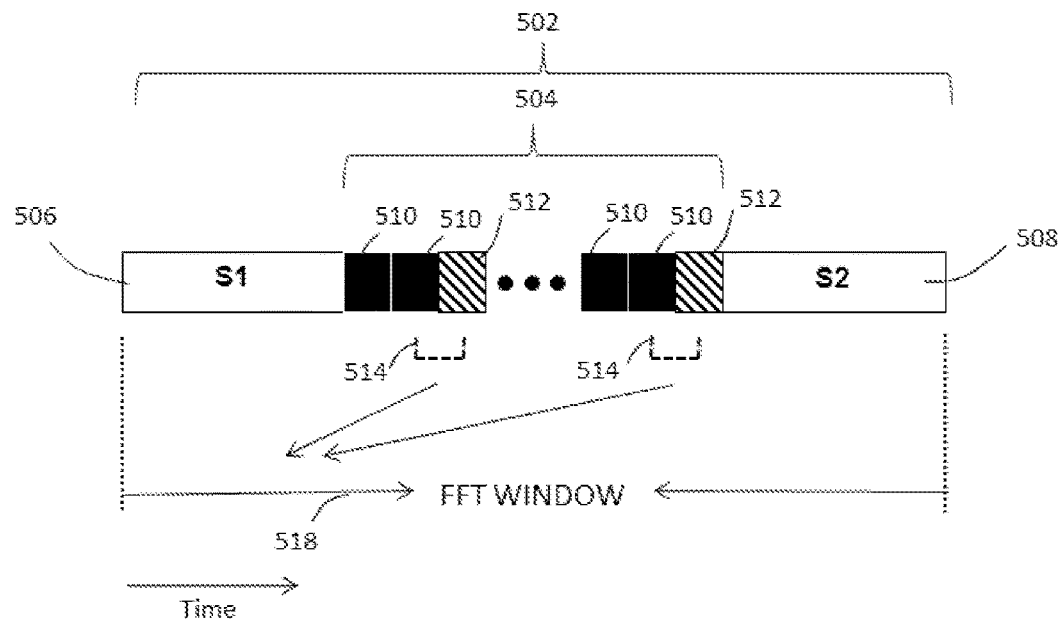
FIG. 5 is a conceptual block diagram of a fourth data sequence with relatively longer pilot sequences in the time domain, in accordance with some embodiments.

FIG. 5 is a conceptual block diagram 500 of a fourth data sequence 502 with relatively longer pilot sequences in the time domain, in accordance with some embodiments. This fourth data sequence 502 may include a user data sequence 504 (e.g., third data sequence) concatenated with the front pilot sequence 506 (e.g., S1) at one end (e.g., a front end with an earlier time domain location) and the rear pilot sequence 508 (e.g., S2) at the other end (e.g., a back end with a later time domain location). Furthermore, the user data sequence 504 (e.g., third data sequence) may include modulated user data elements 510 (e.g., first data) interleaved with conjugate data elements 512 (e.g., second data).

More specifically, the interleaving may result in having every second modulated user data element 510 (e.g., first data) be adjacent with a respective conjugate data element 512 (e.g., second data) so that conjugate pairs 514 are formed between every second modulated user data elements 510 (e.g., first data) and respective conjugate data element 512 (e.g., second data). Stated another way, at least one modulated user data element 510 (e.g., first data) may be concatenated with another modulated user data element 510 (e.g., first data) and concatenated with a conjugate data element 512 (e.g., second data) that is its conjugate pair. As noted above, a conjugate data element 512 (e.g., second data) may be a conjugate or a negative conjugate of a respective modulated user data element 510 (e.g., first data). Additionally, the size of the fourth data sequence 502 may be equivalent to a single Fourier window 518 (e.g., a window length for FFT processing).

In certain embodiments, the number of modulated user data elements 510 (e.g., first data) may be twice that of the conjugate data elements 512 (e.g., second data). Stated another way, in the user data sequence 504 (e.g., third data sequence) obtained after the insertion, the adjacent data intervals of the conjugate data elements 512 (e.g., second data) are the same. Inserting front pilot sequence 506 (e.g., S1) at one end (e.g., a front end with an earlier time domain location) and the rear pilot sequence 508 (e.g., S2) at the other end (e.g., a back end with a later time domain location) may result in the fourth data sequence 502. In certain embodiments, the lengths of the front pilot sequence 506 (e.g., S1) and the rear pilot sequence 508 (e.g., S2) may be the same or different, depending on the multipath nature of the wireless channel. In further embodiments, a length adjustment may be such that the front pilot sequence 506 (e.g., S1) and the rear pilot sequence 508 (e.g., S2) are the same length. In various embodiments, the size of the fourth data sequence 502 may be equivalent to a single Fourier window 518 (e.g., a window length for FFT processing).

As illustrated in FIG. 5, the quantity and/or length of the modulated user data elements 510 (e.g., first data) may be greater than that of the conjugate data elements 512 (e.g., second data). Also, the front pilot sequence 506 (e.g., S1) and the rear pilot sequence 508 (e.g., S2) may be relatively longer than that as illustrated in FIG. 4 (assuming the same FFT window length or fourth data sequence length). Accordingly, the fourth data sequence 502 of FIG. 5 may reflect a situation where multipath delay is big and the phase noise changes slowly in the time domain (no change across every three sample points (e.g., three data elements)). Also, the length of the fourth data sequence 502 may be the length of a single Fourier window 518 (e.g., a window length for FFT processing). Accordingly, the starting and ending position of the fourth data sequence 502 may be the starting and ending position of the single Fourier window 518 (e.g., a window length for FFT processing).

In particular embodiments, the conjugate data elements 512 (e.g., second data) may have a predefined position in the time domain of 3n, where n is a positive integer. Accordingly, the conjugate data elements 512 (e.g., second data) may be at every third position of the user data sequence 504 (e.g., third data sequence). The control information may be indicated from the transmitter of the fourth data sequence to a receiver of the fourth data sequence via a control information format (e.g., Info-2 or Info-3).

Figure 6:
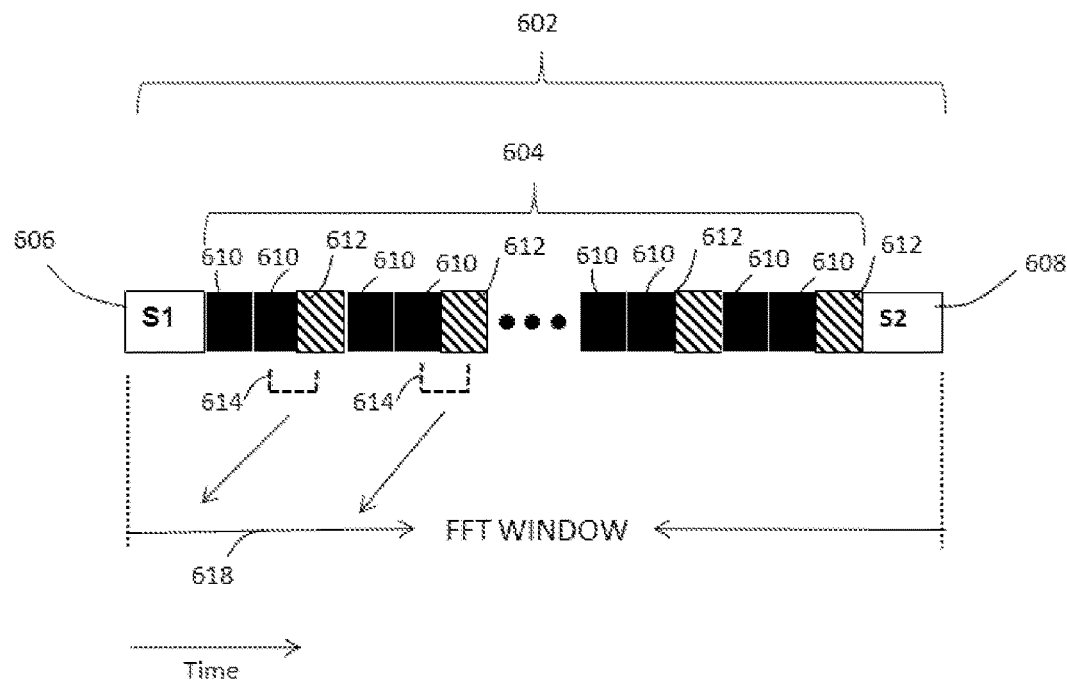
FIG. 6 is a conceptual block diagram of a fourth data sequence with relatively shorter pilot sequences with greater user data throughput in the time domain, in accordance with some embodiments.

FIG. 6 is a conceptual block diagram 600 of a fourth data sequence 602 with relatively shorter pilot sequences with greater user data throughput in the time domain, in accordance with some embodiments. This fourth data sequence 602 may include a user data sequence 604 (e.g., third data sequence) concatenated with the front pilot sequence 606 (e.g., S1) at one end (e.g., a front end with an earlier time domain location) and the rear pilot sequence 608 (e.g., S2) at the other end (e.g., a back end with a later time domain location). Furthermore, the user data sequence 604 (e.g., third data sequence) may include modulated user data elements 610 (e.g., first data) interleaved with conjugate data elements 612 (e.g., second data).

More specifically, the interleaving may result in having every second modulated user data element 610 (e.g., first data) be adjacent with a respective conjugate data element 612 (e.g., second data) so that conjugate pairs 614 are formed between every second modulated user data elements 610 (e.g., first data) and respective conjugate data element 612 (e.g., second data). Accordingly, at least one modulated user data element 610 (e.g., first data) may be concatenated with another modulated user data element 610 (e.g., first data) and concatenated with a conjugate data element 612 (e.g., second data) that is its conjugate pair. As noted above, a conjugate data element 612 (e.g., second data) may be a conjugate or a negative conjugate of a respective modulated user data element 610 (e.g., first data). Additionally, the size of the fourth data sequence 602 may be equivalent to a single Fourier window 618 (e.g., a window length for FFT processing).

In certain embodiments, the number of modulated user data elements 610 (e.g., first data) may be twice that of the conjugate data elements 612 (e.g., second data). Stated another way, in the user data sequence 604 (e.g., third data sequence) obtained after the insertion, the adjacent data intervals of the conjugate data elements 612 (e.g., second data) are the same. Inserting front pilot sequence 606 (e.g., S1) at one end (e.g., a front end with an earlier time domain location) and the rear pilot sequence 608 (e.g., S2) at the other end (e.g., a back end with a later time domain location) may result in the fourth data sequence. In certain embodiments, the lengths of the front pilot sequence 606 (e.g., S1) and the rear pilot sequence 608 (e.g., S2) may be the same or different, depending on the multipath nature of the wireless channel. In further embodiments, a length adjustment may be such that the front pilot sequence 606 (e.g., S1) and the rear pilot sequence 608 (e.g., S2) are the same length. In various embodiments, the size of the fourth data sequence 602 may be equivalent to a single Fourier window 618 (e.g., a window length for FFT processing).

As illustrated in FIG. 6, the quantity and/or length of the modulated user data elements 610 (e.g., first data) may be greater than that of the conjugate data elements 612 (e.g., second data). Also, the front pilot sequence 606 (e.g., S1) and the rear pilot sequence 608 (e.g., S2) may be relatively smaller than that as illustrated in FIG. 5 (assuming the same FFT window length or fourth data sequence length). FIG. 6 may reflect an embodiment with greater user data throughput per unit time given that the fourth data sequence 602 is constant between FIG. 5 and FIG. 6. Furthermore, the fourth data sequence 602 of FIG. 6 may reflect a situation where multipath delay is small and the phase noise changes slowly in the time domain (e.g., no change every three sample points). The length of the fourth data sequence 602 may be the length of a single Fourier window 618 (e.g., a window length for FFT processing). Stated another way, the starting and ending position of the fourth data sequence 602 may be the starting and ending position of the single Fourier window 618 (e.g., a window length for FFT processing).

In particular embodiments, the conjugate data elements 612 (e.g., second data) may have a predefined position in the time domain of 3n, where n is a positive integer. Stated another way, the conjugate data elements 612 (e.g., second data) may be at every third position of the user data sequence 604 (e.g., third data sequence). The control information may be indicated from the transmitter of the fourth data sequence to a receiver of the fourth data sequence via a control information format (e.g., Info-2 or Info-3).

While various embodiments of the invention have been described above, it should be understood that they have been presented by way of example only, and not by way of limitation. Likewise, the various diagrams may depict an example architectural or configuration, which are provided to enable persons of ordinary skill in the art to understand example features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described example embodiments.

It is also understood that any reference to an element or embodiment herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a device, comprising:
   modulating user data into modulated user data elements;
   determining conjugate data elements, wherein each conjugate data element is a conjugate or opposite conjugate of a respective one of the modulated user data elements; and
   transmitting, over a time domain, a front pilot sequence immediately followed by a user data sequence comprising the modulated user data elements interleaved with the conjugate data elements, and a rear pilot sequence after transmitting the user data sequence, wherein the front pilot sequence and the rear pilot sequence are predetermined collections of data elements.

2. The method of claim 1, wherein a combination of the front pilot sequence, the user data sequence, and the rear pilot sequence is a predetermined number of data elements.

3. The method of claim 1, wherein a combination of the front pilot sequence, the user data sequence, and the rear pilot sequence occupies a single Fourier window.

4. The method of claim 3, wherein the front pilot sequence begins at a beginning of the single Fourier window and the rear pilot sequence ends at an end of the single Fourier window.

5. The method of claim 1, further comprising:
   transmitting the user data sequence after processing by a Fourier transform.

6. The method of claim 1, further comprising:
   transmitting the user data sequence after filtering and conversion from a digital signal to an analog signal.

7. A method performed by a device, comprising:
   receiving a front pilot sequence immediately followed by a user data sequence, and a rear pilot sequence immediately following the user data sequence, wherein the user data sequence comprises modulated user data elements interleaved with conjugate data elements, wherein the conjugate data elements are each a conjugate or negative conjugate of different modulated user data elements, and wherein the front pilot sequence and the rear pilot sequence are predetermined collections of data elements; and
   demodulating the user data sequence to produce user data.

8. The method of claim 7, further comprising:
   determining a phase error estimate based on pilot signals comprising the front pilot sequence and the rear pilot sequence; and
   demodulating the user data sequence based on compensating for the phase error estimate.

9. The method of claim 7, wherein the user data sequence comprises an equal number of the modulated user data elements and the conjugate data elements.

10. The method of claim 7, wherein the user data sequence comprises the modulated user data elements interleaved with the conjugate data elements in consistent intervals.

11. The method of claim 7, wherein the user data sequence comprises the modulated user data elements interleaved with the conjugate data elements at predetermined time domain locations.

12. The method of claim 7, wherein the user data sequence comprises at least one of:
   every modulated user data element followed by a corresponding one of the conjugate data elements,
   every conjugate data element followed by a corresponding one of the modulated user data elements,
   every second modulated user data element followed by a corresponding one of the conjugate data elements,
   every conjugate data element followed by a corresponding one of every second modulated user data elements,
   every third modulated user data element followed by a corresponding one of the conjugate data elements,
   every conjugate data element followed by a corresponding one of every third modulated user data elements,
   every fourth modulated user data element followed by a corresponding one of the conjugate data elements, and
   every conjugate data element followed by a corresponding one of every fourth modulated user data elements.

13. The method of claim 7, wherein the front pilot sequence and the rear pilot sequence are demodulated for a common phase error compensation technique.

14. The method of claim 7, further comprising:
   receive control information comprising time domain locations associated with the conjugate data elements to a recipient of the user data sequence.

15. The method of claim 14, further comprising:
   receive the control information as part of a control channel or radio resource control (RRC) signaling.

16. A device, comprising:
   a processor configured to:
      modulate user data into modulated user data elements,
      determine conjugate data elements, wherein each conjugate data element is a conjugate or opposite conjugate of a respective one of the modulated user data elements, and
   a transmitter configured to:
      transmit, over a time domain, a front pilot sequence immediately followed by a user data sequence comprising the modulated user data elements interleaved with the conjugate data elements, and a rear pilot sequence after transmitting the user data sequence, wherein the front pilot sequence and the rear pilot sequence are predetermined collections of data elements.

17. A device, comprising:
   a receiver and a processor configured to implement the method of claim 7.

* * * * *